US009432180B2

(12) United States Patent
Collins et al.

(10) Patent No.: US 9,432,180 B2
(45) Date of Patent: Aug. 30, 2016

(54) METHOD AND SYSTEM FOR A PROGRAMMABLE PARALLEL COMPUTATION AND DATA MANIPULATION ACCELERATOR

(75) Inventors: Michael Dean Collins, Crofton, MD (US); Lee P. Noehring, Peoria, AZ (US); Bryan Doi, Chandler, AZ (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/487,312

(22) Filed: Jun. 4, 2012

(65) Prior Publication Data

US 2012/0311349 A1 Dec. 6, 2012

Related U.S. Application Data

(60) Provisional application No. 61/493,172, filed on Jun. 3, 2011.

(51) Int. Cl.
*H04L 9/00* (2006.01)
*H04L 9/06* (2006.01)
*G09C 1/00* (2006.01)

(52) U.S. Cl.
CPC . *H04L 9/06* (2013.01); *G09C 1/00* (2013.01); H04L 2209/125 (2013.01)

(58) Field of Classification Search
USPC .......................................................... 713/189
See application file for complete search history.

(56) References Cited

U.S. PATENT DOCUMENTS

| | | | |
|---|---|---|---|
| 6,295,606 B1* | 9/2001 | Messerges et al. ............ 713/189 |
| 6,397,240 B1* | 5/2002 | Fernando ................. G06F 7/523 |
| | | | 708/603 |
| 6,622,283 B1* | 9/2003 | Cohen .................... H03M 13/23 |
| | | | 714/792 |
| 6,922,472 B2* | 7/2005 | Lee ...................... G06F 9/30032 |
| | | | 380/1 |
| 7,346,161 B2* | 3/2008 | Shimoyama ...................... 380/29 |
| 8,051,239 B2* | 11/2011 | Nieminen .......................... 711/5 |
| 8,446,813 B1* | 5/2013 | Nieminen ...................... 370/203 |
| 8,479,016 B2* | 7/2013 | Michiels et al. ................ 713/189 |
| 8,707,051 B2* | 4/2014 | Osugi et al. ................... 713/189 |
| 2005/0071403 A1* | 3/2005 | Taunton ............... G06F 9/30014 |
| | | | 708/404 |

(Continued)

OTHER PUBLICATIONS

Malkhi, Dahlia, Moni Naor, and David Ratajzcak, Viceroy: Scalable Emulation of Butterfly Networks for Distributed Hash Tables, Nov. 11, 2003.*

(Continued)

*Primary Examiner* — Christopher Revak
(74) *Attorney, Agent, or Firm* — Davidson Berquist Jackson & Gowdey LLP

(57) ABSTRACT

Methods and systems are provided for a programmable parallel computation and data manipulation accelerator that may be used, for example, in cryptographic calculations. They allow acceleration of a broad variety of cryptographic algorithms and/or portions of algorithms, and are not algorithm specific. This system comprises a butterfly and inverse butterfly multiplexing permuter network and a lookup table. This system may allow replication of input registers, "expansion," so that an individual bit may be used in multiple calculations in parallel, accelerating completion of the cryptographic algorithm. The system may allow "diffusion" of the expanded bits through the system's butterfly and inverse butterfly network, and may provide for "confusion" of the resulting bits through the system's lookup table. In some implementations, the system may allow completion of a computation within an algorithm within one clock cycle.

19 Claims, 4 Drawing Sheets

(56) References Cited

U.S. PATENT DOCUMENTS

| | | | |
|---|---|---|---|
| 2007/0255849 A1 | 11/2007 | Zheng | |
| 2008/0301383 A1* | 12/2008 | Nieminen | 711/157 |
| 2009/0138534 A1 | 5/2009 | Lee et al. | |
| 2010/0106944 A1 | 4/2010 | Symes et al. | |
| 2012/0311348 A1* | 12/2012 | Osugi et al. | 713/189 |

OTHER PUBLICATIONS

International Search Report and Written Opinion mailed Aug. 10, 2012 in PCT/US2012/040689.

PCT/US2012/040689 International Preliminary Report on Patentability issued Dec. 4, 2013.

Leemon C. Baird III, et al., On Efficient Bijections Between Permutations and Functions, U.S. Air Force Academy Technical Report, May 26, 2006.

Askar, M. et al., Design and SystemC Implementation of a Crypto Processor for AES and DES Algorithms, ISC Turkey, 13-14 Arahk Dec. 2007.

EP Appln. No. 12793603.7—Extended European Search Report issued Sep. 10, 2015.

Hilewitz, Yedidya, Advanced bit manipulation instructions Architecture, implementation and applications, Princeton University dissertation, Sep. 1, 2008.

NIST—National Institute of Standards and Technology, FIPS Pub 46-3, Data Encryption Standard (DES), Oct. 25, 1999.

* cited by examiner

METHOD AND SYSTEM FOR A PROGRAMMABLE PARALLEL COMPUTATION AND DATA MANIPULATION ACCELERATOR

RELATED APPLICATIONS

Benefit is claimed to U.S. Provisional Patent Application Ser. No. 61/493,172 filed Jun. 3, 2011, entitled "Method and System for a Programmable Parallel Computation and Data Manipulation Accelerator," which is incorporated by reference herein.

This application is related to U.S. patent application Ser. No. 13/487,296 filed on Jun. 4, 2012, entitled "Method and System for Embedded High Performance Reconfigurable Firmware Cipher," which is also incorporated by reference herein.

FIELD OF THE INVENTION

This generally relates to cryptographic calculations and more particularly to computational acceleration of general discrete mathematical operations.

BACKGROUND

Modern cryptography, the practice and study of securing information, operates using algorithms which often require a large number of arithmetic computations of varying complexity. These cryptographic computations are essential to many security services such as authentication, confidentiality, and integrity.

A variety of algorithms are used to implement cryptographic functionality. Some of these algorithms contain complex arithmetic steps requiring comparatively long processing times. Conventional cryptographic algorithm acceleration methods typically attempt to accelerate one particular cryptographic algorithm at a time through specially designed hardware interfaced with software through a custom set of instructions programmed into a processor. Therefore, while conventional methods focus on a particular algorithm, conventional systems are not designed to have the general capability to accelerate multiple different algorithms using a single method or system.

Some recent research has attempted to identify generic acceleration instructions which are independent of any algorithm. However, they lack tight integration within the processing environment, and they lack the computational power for significant improvements in the computational efficiency of the algorithm.

Encryption algorithms utilize the ability to mix, or "permute," incoming data by remapping the data, or portions thereof, to the output. Such mappings often separate the distinctive properties of diffusion and confusion to varying degrees. While conventional bit permuters which support diffusion related computations are located outside of the Arithmetic Logic Unit ("ALU"), the digital circuit that performs arithmetic and logic operations, rather than integrated within the ALU, Conventional acceleration circuits do not tightly couple and integrate both diffusion and confusion principles.

Many conventional systems maintain only one copy of each individual bit in a single location. Many acceleration strategies do this so that hardwired circuits can route multiple instances of those values to combinational logic efficiently. However, this hardwiring by its nature limits the general applicability of such circuits to a wide variety of algorithms.

Similarly, by only maintaining one copy of each bit, these systems ensure that where a bit is required for multiple calculations, the single copy of that bit may be only available to one calculation at a time, requiring the calculations to be performed in serial rather than in parallel, elongating processing time for the algorithm Further, maintaining a single copy of each individual bit in a conventional system located without tightly integrating its location within the computational circuitry forces additional software to preparations of the data input, slowing input/output ("I/O") processing associated with the desired computation.

By treating the required instruction set as a generic bit permuter, conventional systems offer limited capabilities and throughput speed. Finally, the lack of integration of diffusion related permutations with confusion related calculations requires the programmer to provide separate instructions to perform the actual computation increasing the input/output processing requirements, limiting the parallelization and pipe-lining potential, and wasting further time and man-hours.

Accordingly, there is a desire for a computation and data manipulation accelerator which overcomes these and other related problems.

SUMMARY

A method in a data processing system is provided for accelerating a cryptographic algorithm calculation comprising inputting data bits into a butterfly network, and permuting the data bits in the butterfly network based on a predetermined calculation. The method further comprises outputting the permuted data bits from the butterfly network to a look up table, and transforming the inputted permuted data bits in the look up table based on the predetermined calculation. The method also comprises outputting the transformed data bits from the look up table.

A data processing system is provided for accelerating a cryptographic protocol calculation, comprising a butterfly network configured to input data bits, permute the data bits in the butterfly network based on a predetermined calculation, and output the permuted data bits from the butterfly network to a look up table. The data processing system further comprises a look up table configured to input the permuted data bits from the butterfly network, transform the inputted permuted data bits in the look up table based on the predetermined calculation, and output the transformed data bits from the look up table.

DETAILED DESCRIPTION

Methods and systems in accordance with the present invention provide a programmable parallel computation and data manipulation accelerator that may be used, for example, in cryptographic calculations. Methods and systems in accordance with the present invention allow acceleration of a broad variety of cryptographic algorithms and/or portions of algorithms, these methods and systems are not algorithm specific. This system comprises a butterfly and inverse butterfly multiplexing permuter network and a lookup table. In some implementations, this system may be implemented on an application specific integrated circuit ("ASIC") within the cryptographic development processing engine ("CDPE"). In some implementations, multiple processors may be arranged to a bank of instances of this assembly in a tightly integrated approach allowing all of the processors to accelerate portions of computations specific to their independent processes or to support coordinated parallelization of a particular algorithm. In some implementations, this system may allow replication of input registers, "expansion," so that an individual bit may be used in multiple calculations in parallel, accelerating completion of the cryptographic algorithm. In some implementations the system may allow "diffusion" of the expanded bits through the system's butterfly and inverse butterfly network. In some implementations the system may allow "confusion" of the resulting bits through the system's lookup table. In some implementations, the system may allow completion of a computation within an algorithm within one clock cycle, the time between two adjacent pulses of the oscillator that sets the tempo of the computer processor.

Figure 1:
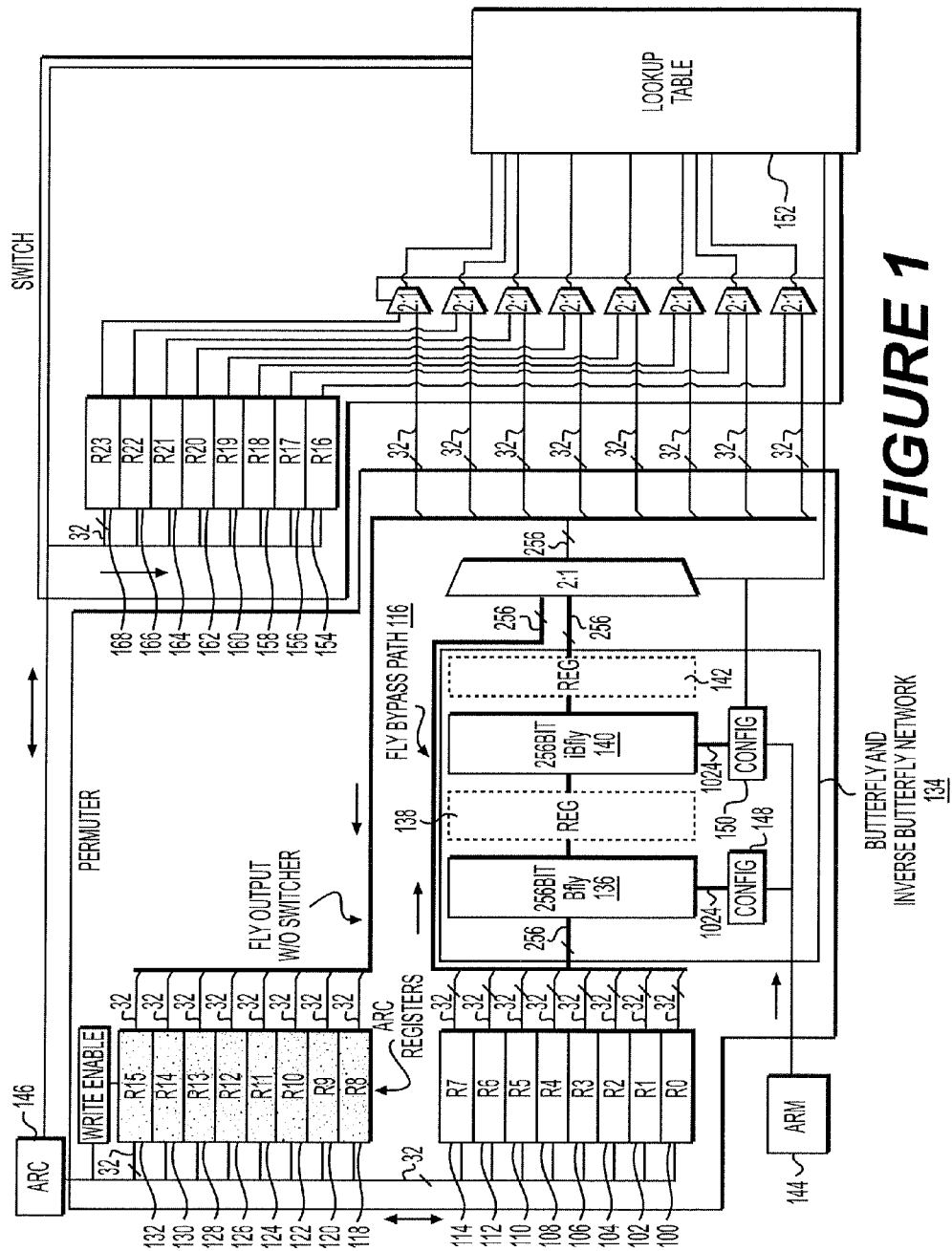
FIG. 1 illustrates an exemplary embodiment of a programmable parallel computation and data manipulation accelerator made in accordance with methods and systems consistent with the present invention.

FIG. 1 illustrates an exemplary embodiment of a programmable parallel computation and data manipulation accelerator made in accordance with methods and systems consistent with the present invention. It should be understood that the specific numbers of bits provided in the discussion of FIG. 1 are used by way of example only, one of ordinary skill in the art will readily see that any suitable alternate numbers of bits may be used. The user may identify an algorithm which the user would like performed quicker. The algorithm may be, for example, a cryptographic algorithm such as the Advance Encryption Standard (AES), RC-4, or a hash algorithm such as MD-5, SHA-256, or a Cyclic Redundancy Check (CRC). Other algorithms may be used. The user may input the bits of this algorithm, for example as one 32 bit word, into the system using ARC 146, an embedded system processor. The input 32 bits may then be copied into input registers R0 100, R1 102, R2 104, R3 106, R4 108, R5 110, R6 112, and R7 114, creating 8 copies of the input data in a process called "expansion," facilitating parallel performance of computations which use the same bit. In the example of FIG. 1, the 32 bit word sent from ARC 146 is copied serially into R0 100, R1 102, R2 104, R3 106, R4 108, R5 110, R6 112, and R7 114 so that each of these input registers contains an identical copy of the original 32 bit word. It should be understood that alternate implementations may comprise any number of input registers. The 8 input registers are then directly sensed, and the entire 256 bit matrix is output by the 8 input registers. This 256 bit output may be routed into the Butterfly and Inverse Butterfly Network 134 comprising Bfly 136, Reg 138, IBfly 140, and Reg 142. The butterfly and inverse butterfly network is programmed using ARM 144, an embedded system processor. The user may identify an algorithm or part of an algorithm, for example a single calculation, the user wishes the system to perform and load that algorithm or part of an algorithm onto ARM 144. As part of that loading process, specific bits or groups of bits, for example 1024 bits for a 1024 bit configuration memory, may be loaded into configuration memory Config 148 and/or Config 150, these bits corresponding to the algorithm the user will be running. Those bits will ultimately be read by either Bfly 136 (for bits in Config 148) or IBfly 138 (for bits in Config 150) to facilitate proper connection of pathways through the permuter circuit.

Once the 256 bit output from the 8 input registers is in the butterfly and inverse butterfly network, the system performs "diffusion" of the data. The butterfly and inverse butterfly network "permutes" the various bits, changing their locations within the registers based on how the user has configured the network to run the desired algorithm. In some implementations, this permutation of bits may be done in parallel. In some implementations, the 256 bit output may then be divided into bytes, 8 bit words. In other implementations, the output from the diffusion process may be divided into "nibbles," 4 bit words (as opposed to the 8 bit bytes).

The 32 byte output from the diffusion process then undergoes a process known as "confusion." Each of the 32 bytes is fed, in parallel with the other bytes, into Lookup Table 152. Lookup Table 152, like the butterfly and inverse butterfly network, is also programmed and loaded by ARM 144. Lookup Table 152 is loaded with the appropriate number of bits, for example 256 bits, and uses any 8-bit Boolean function to change each byte into one bit based on the Boolean function. These 32 computed bits are written to a single 32-bit register (in the case of 8-bit output from the BFLY/IBFLY permutation) which is then available to the ARM as the result of the desired computation. Alternatively, the system may route the 256 bit output from the 8 input registers down Fly Bypass Path 116 and then, one 32 bit word each, through output registers R8 118, R9 120, R10 122, R11 124, R12 126, R13 128, R14 130, and R15 132, for completion of a calculation. At this point, the process follows the same process as for the lookup table.

In some implementations, the butterfly and inverse butterfly network and the Lookup Table 152 may be used separately, in parallel. In these implementations, the initial input data load to undergo the confusion process via Lookup Table 152 is copied into alternate input registers R16 154, R17 156, R18 158, R19 160, R20 162, R21 164, R22 166 and R23 168. Then, data loaded onto these 8 alternate input registers is routed directly to Lookup Table 152 without undergoing diffusion in the butterfly and inverse butterfly network.

Figure 2:
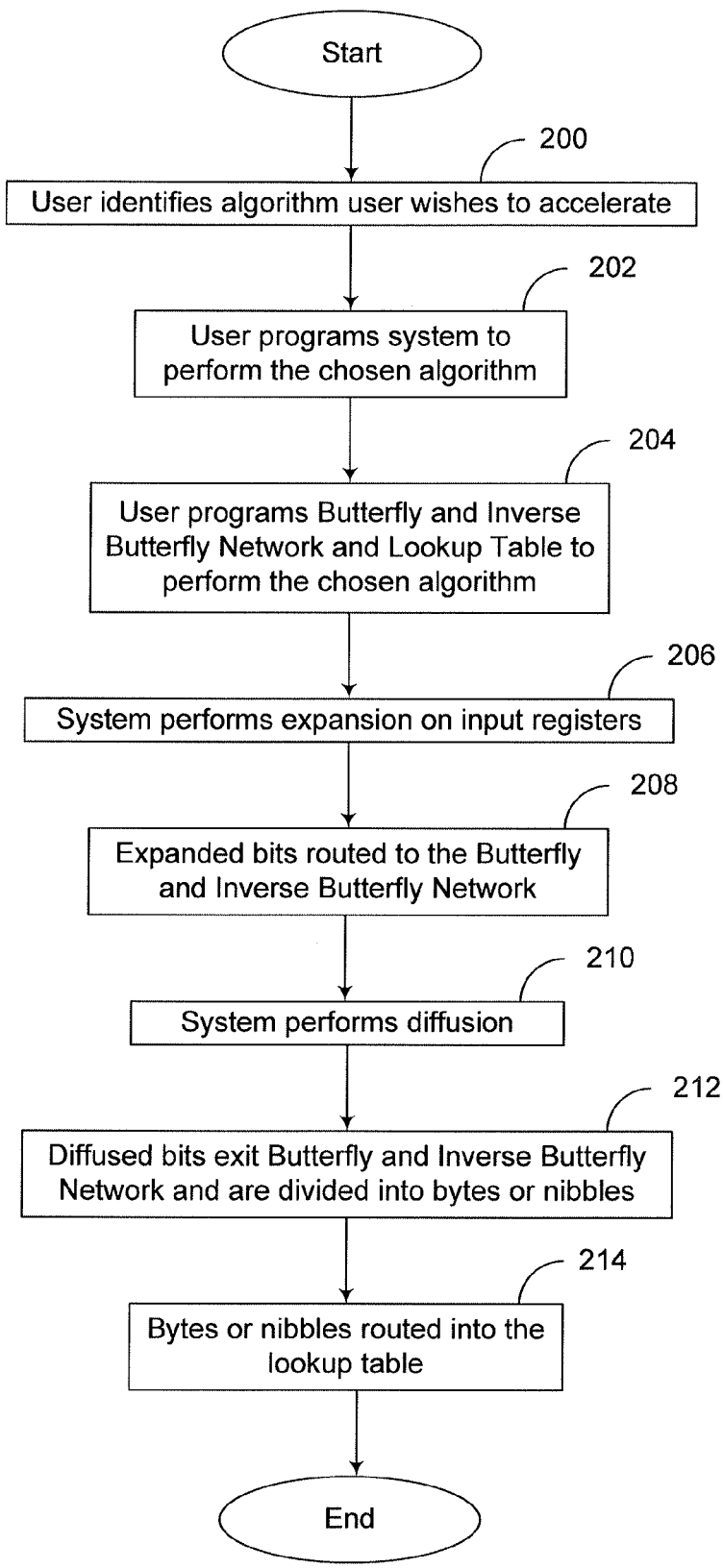
FIG. 2 illustrates steps in an exemplary method for use of a programmable parallel computation and data manipulation accelerator in accordance with methods and systems consistent with the present invention.

FIG. 2 illustrates steps in an exemplary method for use of a programmable parallel computation and data manipulation accelerator in accordance with methods and systems consistent with the present invention. First, the user identifies a specific algorithm which the user wishes to accelerate (step 200). The user programs the system to perform the chosen algorithm through the system processors, for example by programming it into ARM 144 and ARC 146 of FIG. 1 (step 202). Further, the user programs the Butterfly and Inverse Butterfly Network 134 and the Lookup Table 152, according to the algorithm the user desires to accelerate, using ARM 144 (step 204). The system performs the expansion process, copying the input data into the input registers, for example input registers R0 100, R1 102, R2 104, R3 106, R4 108, R5

110, R6 112, and R7 114 of FIG. 1 (step 206). The expanded bits are routed to the system's Butterfly and Inverse Butterfly Network, for example Butterfly and Inverse Butterfly Network 134 of FIG. 1 (step 208). In the system's Butterfly and Inverse Butterfly Network, the system performs diffusion on the data, permuting the various bits to different locations within the various input registers based on the programmed network configuration (step 210). The diffused data exits the system's Butterfly and Inverse Butterfly Network and is divided into either bytes or nibbles (step 212). Finally, these bytes or nibbles are routed into the system's lookup table, for example Lookup Table 152 of FIG. 1 (step 214).

Figure 3:
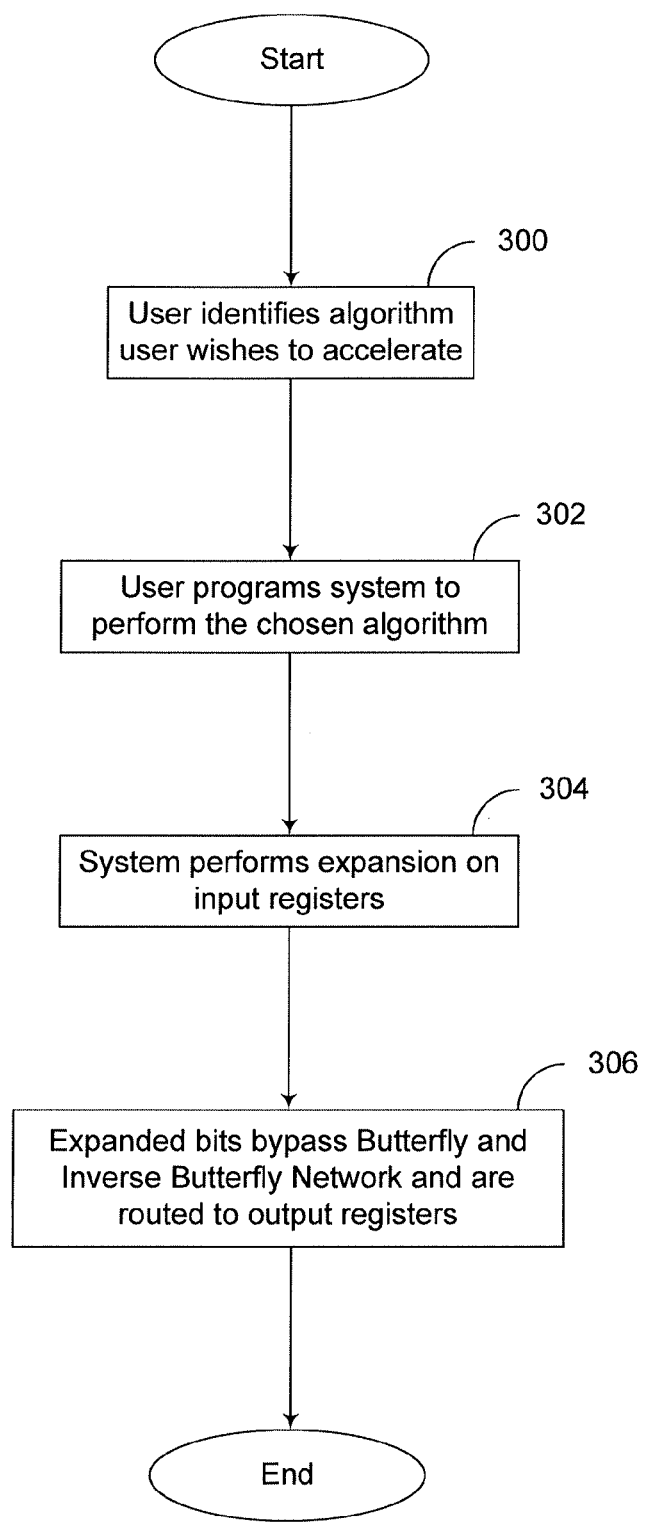
FIG. 3 illustrates steps in an exemplary alternate method for use of a programmable parallel computation and data manipulation accelerator in accordance with methods and systems consistent with the present invention.

FIG. 3 illustrates steps in an exemplary alternate method for use of programmable parallel computation and data manipulation accelerator in accordance with methods and systems consistent with the present invention. First, the user identifies a specific algorithm which the user wishes to accelerate (step 300). The user programs the system to perform the chosen algorithm through the system processors, for example by programming it into ARM 144 and ARC 146 of FIG. 1 (step 302). The system performs the expansion process, copying the input data into the input registers, for example input registers R0 100, R1 102, R2 104, R3 106, R4 108, R5 110, R6 112, and R7 114 of FIG. 1 (step 304). Finally, the expanded bits from the input registers bypass the system's Butterfly and Inverse Butterfly Network, for example via Fly Bypass Path 116 of FIG. 1, and are routed to the system's output registers, for example output registers R8 118, R9 120, R10 122, R11 124, R12 126, R13 128, R14 130, and R15 132 (step 306).

Figure 4:
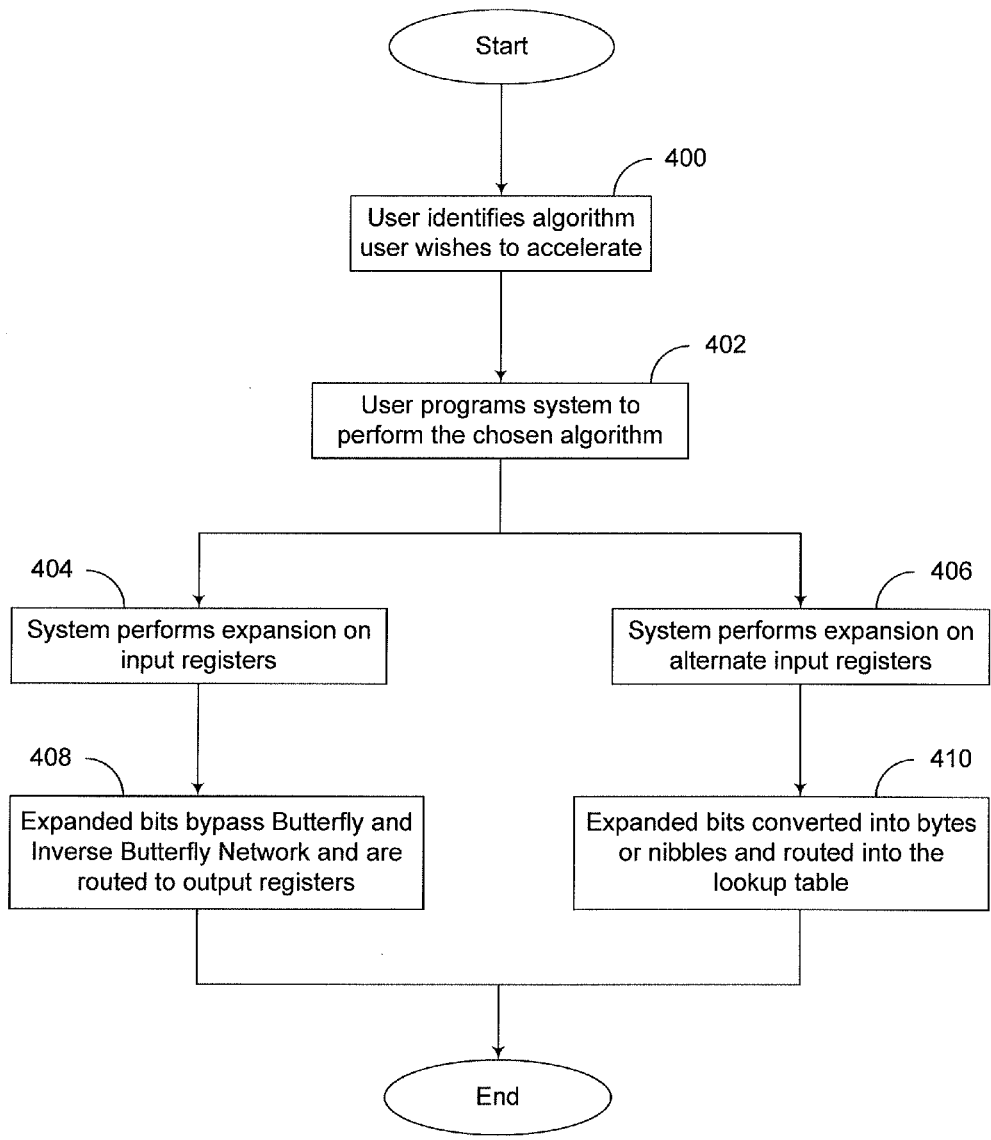
FIG. 4 illustrates steps in an exemplary alternate method for use of a programmable parallel computation and data manipulation accelerator in accordance with methods and systems consistent with the present invention.

FIG. 4 illustrates steps in an exemplary alternate method for use of a programmable parallel computation and data manipulation accelerator in accordance with methods and systems consistent with the present invention. First, the user identifies a specific algorithm which the user wishes to accelerate (step 400). In this implementation, the butterfly and inverse butterfly network and the lookup table may be used separately, which may provide for two different algorithms being accelerated at the same time or two different portions of the same algorithm being accelerated at essentially the same time. The user programs the system to perform the chosen algorithm through the system processors, for example by programming it into ARM 144 and ARC 146 of FIG. 1 (step 402). The system performs expansion on the input registers, for example, input registers R0 100, R1 102, R2 104, R3 106, R4 108, R5 110, R6 112, and R7 114 of FIG. 1 (step 404). Simultaneously, the system performs expansion on the alternate input registers, for example alternate input registers R16 154, R17 156, R18 158, R19 160, R20 162, R21 164, R22 166, and R23 168 of FIG. 1 (step 406). The expanded bits from the input registers bypass the system's Butterfly and Inverse Butterfly Network, for example via Fly Bypass Path 116 of FIG. 1, and are routed to the system's output registers, for example output registers R8 118, R9 120, R10 122, R11 124, R12 126, R13 128, R14 130, and R15 132 (step 408). Simultaneously, the expanded bits from the alternate input registers are converted into bytes or nibbles and routed into the system's lookup table, for example Lookup Table 152 of FIG. 1 (step 410).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

The invention claimed is:

1. A method in a data processing system for accelerating a cryptographic algorithm calculation, comprising:
    inputting data bits into multiple input registers;
    copying the inputted data bits into duplicate copies to be input to a butterfly network, wherein each inputted data bit has at least two duplicate copies;
    inputting the duplicate copies of the data bits into a butterfly network;
    permuting the duplicate copies of the data bits in the butterfly network based on a predetermined calculation;
    outputting the permuted data bits from the butterfly network to a look up table;
    transforming the inputted permuted data bits in the look up table based on the predetermined calculation; and
    outputting the transformed data bits from the look up table.

2. The method of claim 1, further comprising programming the butterfly network to permute the duplicate copies of the data bits based on the predetermined calculation.

3. The method of claim 2, wherein the predetermined calculation is based on a cryptographic protocol.

4. The method of claim 1, further comprising programming the look up table to transform the inputted permuted data bits based on the predetermined calculation.

5. The method of claim 1, wherein the butterfly network is a butterfly and inverse butterfly network.

6. The method of claim 1, where the transformed data bits outputted from the look up table are less bits than the inputted permuted data bits.

7. The method of claim 1, further comprising inputting 256 data bits into the butterfly network.

8. The method of claim 1, further comprising:
    inputting 32 data bits into 8 input registers;
    outputting 256 data bits from the 8 input registers; and
    inputting the 256 data bits into the butterfly network to be permuted by the butterfly network.

9. The method of claim 8, further comprising:
    outputting 256 bits from the butterfly network into the lookup table; and
    outputting 32 bits from the lookup table.

10. A data processing system for accelerating a cryptographic protocol calculation, comprising:
    a plurality of input registers configured to:
        input data bits;
        copy the inputted data bits into duplicate copies to be input to a butterfly network, wherein each inputted data bit has at least two duplicate copies;
        output the duplicate copies of the data bits to a butterfly network; and
    the butterfly network configured to:
        input the duplicate copies of the data bits;
        permute the duplicate copies of the data bits in the butterfly network based on a predetermined calculation; and
        output the permuted data bits from the butterfly network to a look up table; and
    the look up table configured to:
        input the permuted data bits from the butterfly network;
        transform the inputted permuted data bits in the look up table based on the predetermined calculation; and
        output the transformed data bits from the look up table.

11. The method of claim 10, wherein the data processing system is an integrated circuit.

12. The data processing system of claim 10, a processor configured to program the butterfly network to permute the duplicate copies of the data bits based on the predetermined calculation.

13. The data processing system of claim 12, wherein the predetermined calculation is based on a cryptographic protocol.

14. The data processing system of claim 10, wherein the look up table is programmed to transform the inputted permuted data bits based on the predetermined calculation.

15. The data processing system of claim 10, wherein the butterfly network is a butterfly and inverse butterfly network.

16. The data processing system of claim 10, where the transformed data bits outputted from the look up table are less bits than the inputted permuted data bits.

17. The data processing system of 10, wherein the butterfly network is configured to input 256 data bits.

18. The data processing system of claim 10, wherein the plurality of input registers further comprises:
   8 registers configured to input 32 data bits and output 256 data bits; and
   the butterfly network is configured to input the 256 data bits to be permuted.

19. The data processing system of claim 18, further comprising:
   the butterfly network is configured to output 256 bits to the lookup table; and
   the lookup table is configured to output 32 bits.

* * * * *